(12) United States Patent
Akaike et al.

(10) Patent No.: US 10,099,584 B2
(45) Date of Patent: Oct. 16, 2018

(54) VEHICLE SEAT

(71) Applicant: TOYOTA BOSHOKU KABUSHIKI KAISHA, Aichi-ken (JP)

(72) Inventors: Fumitoshi Akaike, Aichi-ken (JP); Hiroshi Mizobata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 98 days.

(21) Appl. No.: 15/160,558

(22) Filed: May 20, 2016

(65) Prior Publication Data
US 2016/0339821 A1 Nov. 24, 2016

(30) Foreign Application Priority Data

May 22, 2015 (JP) ................... 2015-104456

(51) Int. Cl.
*B60N 2/68* (2006.01)
(52) U.S. Cl.
CPC ...................... *B60N 2/68* (2013.01)
(58) Field of Classification Search
CPC ........ B60N 2/68; B60N 2/682; B60N 2/7041; B60N 2/7047; B60N 2/7052; B60N 2/7058; B60N 2/72; B60N 2/4221; B60N 2/4228; B60N 2/42709
USPC ...... 297/452.18, 216.13, 452.2, 216.1, 284.1
See application file for complete search history.

(56) References Cited

U.S. PATENT DOCUMENTS

| | | | | |
|---|---|---|---|---|
| 5,100,204 A * | 3/1992 | Makihara | ................ | B29C 49/20 264/516 |
| 5,609,395 A * | 3/1997 | Burch | ...................... | A47C 7/42 297/335 |
| 5,897,168 A * | 4/1999 | Bartelt | ...................... | B60N 2/68 29/897.2 |
| 6,027,167 A * | 2/2000 | Blomdell | ........... | B60N 2/42709 297/216.1 |
| 6,074,004 A * | 6/2000 | Carmichael | .......... | B60N 2/4221 297/216.13 |
| 6,176,543 B1 * | 1/2001 | Nawata | ................ | B60N 2/1615 296/187.11 |
| 6,296,291 B1 * | 10/2001 | Lansinger | ............ | B60N 2/4249 296/65.16 |
| 6,554,356 B1 * | 4/2003 | Crose | ..................... | B60N 2/242 297/216.13 |

(Continued)

FOREIGN PATENT DOCUMENTS

| | | |
|---|---|---|
| CN | 201951307 | 8/2011 |
| CN | 103182958 | 7/2013 |
| CN | 103797039 | 5/2014 |
| CN | 104010877 | 8/2014 |
| CN | 204055453 | 12/2014 |
| JP | 2013-193586 | 9/2013 |

OTHER PUBLICATIONS

Office Action issued in Chinese Counterpart Patent Appl. No. 201610341222.9, dated Feb. 24, 2018, along with an English translation thereof.

Primary Examiner — James M Ference
(74) Attorney, Agent, or Firm — Greenblum & Bernstein, P.L.C.

(57) ABSTRACT

A vehicle seat includes a seat frame made of metal; and a reinforcing member that is locally attached to a portion in which stress concentration occurs in the seat frame, the reinforcing member being attached in a state in which the reinforcing member disperses a stress, the reinforcing member having specific gravity smaller than specific gravity of the seat frame.

6 Claims, 13 Drawing Sheets

(56) References Cited

U.S. PATENT DOCUMENTS

| | | | | |
|---|---|---|---|---|
| 7,837,271 B2* | 11/2010 | Galbreath | | B60N 2/72 297/452.48 |
| 2002/0096932 A1* | 7/2002 | Fujita | | B60N 2/58 297/452.56 |
| 2002/0135218 A1* | 9/2002 | Fujita | | B60N 2/5891 297/452.56 |
| 2004/0145230 A1* | 7/2004 | Fujita | | A47C 31/006 297/452.27 |
| 2005/0023880 A1* | 2/2005 | Fourrey | | B29C 45/14631 297/452.18 |
| 2005/0269856 A1* | 12/2005 | Kim | | A47C 7/40 297/452.18 |
| 2008/0038569 A1* | 2/2008 | Evans | | B60N 2/68 428/474.9 |
| 2008/0277993 A1* | 11/2008 | Blankart | | B60N 2/682 297/452.18 |
| 2010/0156162 A1* | 6/2010 | Sweers | | B60N 2/015 297/452.2 |
| 2011/0285161 A1* | 11/2011 | Sweers | | B60N 2/015 296/37.1 |
| 2011/0316320 A1* | 12/2011 | Kulkarni | | B60N 2/682 297/452.48 |
| 2012/0037279 A1* | 2/2012 | Fujita | | B60N 2/68 148/320 |
| 2012/0043791 A1* | 2/2012 | Kojima | | B60N 2/449 297/216.13 |
| 2012/0217775 A1* | 8/2012 | Fujita | | B60N 2/4221 297/216.13 |
| 2013/0134753 A1* | 5/2013 | Buehlmeyer | | B60N 2/38 297/284.1 |
| 2013/0175837 A1* | 7/2013 | Buehlmeyer | | B60N 2/4855 297/284.1 |
| 2013/0257131 A1* | 10/2013 | Nishiura | | B60N 2/68 297/452.18 |
| 2013/0278025 A1* | 10/2013 | Wakabayashi | | B62K 19/16 297/195.1 |
| 2013/0320742 A1* | 12/2013 | Murolo | | B60N 2/68 297/452.18 |
| 2013/0344291 A1* | 12/2013 | Pearson | | B29C 70/865 428/157 |
| 2014/0221550 A1* | 8/2014 | McEvoy | | C08L 75/04 524/500 |
| 2014/0300165 A1* | 10/2014 | Matsumoto | | B60R 22/26 297/354.1 |
| 2014/0300171 A1* | 10/2014 | Velasco | | B64D 11/06 297/452.18 |
| 2014/0327290 A1* | 11/2014 | Matsumoto | | B60R 22/26 297/452.18 |
| 2015/0108819 A1* | 4/2015 | Yamaguchi | | B60N 2/68 297/452.18 |
| 2015/0130254 A1* | 5/2015 | Yamaguchi | | B60N 2/68 297/452.18 |
| 2016/0339821 A1* | 11/2016 | Akaike | | B60N 2/68 |
| 2017/0313226 A1* | 11/2017 | Akaike | | B60N 2/682 |
| 2017/0313227 A1* | 11/2017 | Akaike | | B60N 2/70 |

* cited by examiner

VEHICLE SEAT

INCORPORATION BY REFERENCE

The disclosure of Japanese Patent Application No. 2015-104456 filed on May 22, 2015 including the specification, drawings and abstract is incorporated herein by reference in its entirety.

BACKGROUND OF THE INVENTION

1. Field of the Invention

The invention relates to a vehicle seat. More specifically, the invention relates to a vehicle seat that includes a seat frame made of metal.

2. Description of Related Art

Conventionally, as a frame structure of a vehicle seat, a structure that is configured by joining two metal frame members with different structural strength has been known (Japanese Patent Application Publication No. 2013-193586 (JP 2013-193586 A)). The frame structure is configured as a side frame of a seatback, and is configured such that a frame member with high strength is provided in a base side that is supported from a lower end side via a recliner and a frame member with lower strength is joined to an upper side of the frame member with high strength.

In the above related art, when a large load is applied to the seatback in a front-rear direction, and a large bending load around the recliner is applied to the side frame, stress concentration may occur in a portion where the two frame members are joined and the structural strength sharply changes. Meanwhile, in the case where the portion is reinforced by, for example, increasing the thickness of the portion, the weight increases.

SUMMARY OF THE INVENTION

The invention provides a vehicle seat in which stress concentration is less likely to occur in a seat frame, and an increase in the weight of the seat frame is suppressed.

A vehicle seat according to an aspect of the invention includes a metal seat frame; and a reinforcing member that is locally attached to a portion in which stress concentration occurs in the seat frame, the reinforcing member being attached in a state in which the reinforcing member disperses a stress, and the reinforcing member having specific gravity smaller than specific gravity of the seat frame. The specific gravity is defined herein as usual to be a ratio of the density of a material to the density of water.

According to the above aspect, the stress concentration is less likely to occur in the seat frame due to the reinforcing member that is locally attached to the portion in which the stress concentration occurs in the seat frame while an increase of the weight of the seat frame is suppressed.

In the above aspect of the invention, the seat frame may include a plurality of frame members joined to each other, and the reinforcing member may be attached to a boundary portion in which the frame members are joined to each other and the stress concentration occurs.

In the above configuration, the seat frame includes the plurality of frame members joined to each other. However, even in this configuration, because the reinforcing member is attached to the boundary portion in which the frame members are joined to each other, occurrence of the stress concentration can be appropriately suppressed.

In the above aspect of the invention, the reinforcing member may be attached to a side surface on an outer peripheral side in which a maximum tensile stress is generated at a time when a load causing bending in a direction perpendicular to a longitudinal direction in which the seat frame extends is applied to the seat frame, or a side surface on an inner peripheral side in which a maximum compression stress is generated at the time when the load is applied to the seat frame, the reinforcing member being attached in a state in which the reinforcing member disperses and receives a corresponding one of the maximum tensile stress and the maximum compression stress.

In the above configuration, the portion in the seat frame in which the tensile or compression stress acts most intensively can be appropriately reinforced by the reinforcing member. Thus, it is possible to effectively make the stress concentration less likely to occur.

In the above aspect of the invention, the reinforcing member may be provided in the portion in which the stress concentration occurs in the seat frame such that the reinforcing member extends along a specific in-plane direction, and at least one of a size and a shape of the reinforcing member may be changed in accordance with a magnitude of the stress.

In the above configuration, it is possible to suppress a sharp increase in structural strength of the seat frame at the portion to which the reinforcing member is attached. Thus, the stress concentration is even less likely to occur in the seat frame.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Description will hereinafter be made on a mode for carrying out the invention by using the drawings.

Figure 1:
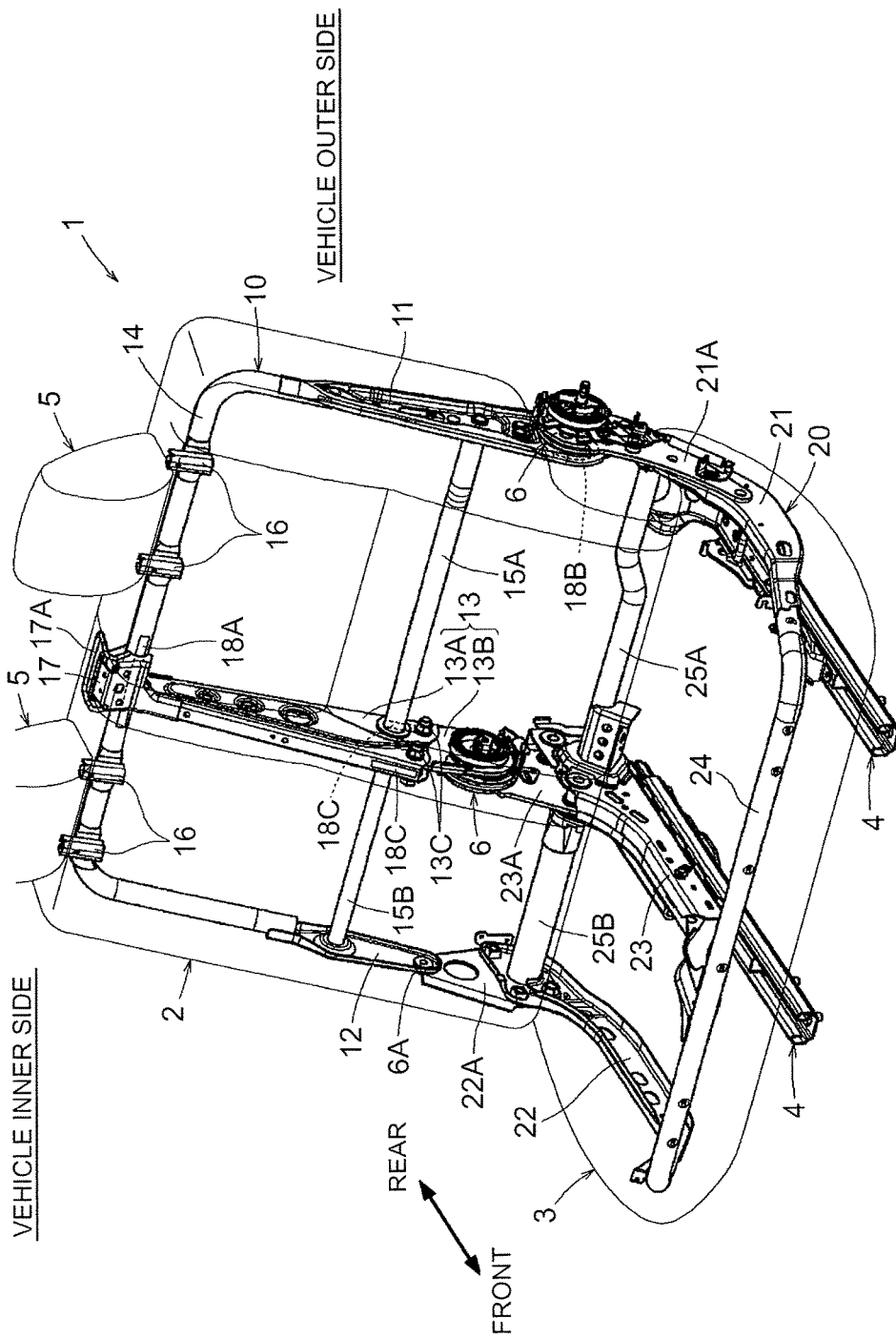
FIG. 1 is a perspective view that shows a schematic configuration of a vehicle seat of a first embodiment.

First, description will be made on a configuration of a seat 1 in a first embodiment by using FIG. 1 to FIG. 11. As shown in FIG. 1, the seat 1 in this embodiment is configured as a rear seat of a vehicle (an automobile) and is configured as a so-called bench seat on which two persons can be seated on right and left sides. In detail, the above seat 1 includes a left seat and a center seat and forms a seat on which three persons can be seated together with a right seat (not shown). The above seat 1 includes a seatback 2 as a backrest for a seated occupant, a seat cushion 3 as a seating portion, and a headrest 5 as a head restraint. A lower end of the above seatback 2 is coupled to a rear end of the seat cushion 3 via a pair of right and left recliners 6 in a state where a backrest angle can be adjusted. The seat cushion 3 is coupled onto a vehicle floor via a pair of right and left slide rails 4 in a state where a position of the seat cushion 3 can be adjusted in a front-rear direction. The headrest 5 is inserted from above and mounted to each of upper parts in a left seat region and a center seat region of the seatback 2.

More specifically, in the seatback 2, a back frame 10 that constitutes a framework of the seatback 2 includes an outer-side frame 11, an inner-side frame 12, a center-side frame 13, an upper pipe 14, reinforcing pipes 15A, 15B, support brackets 16, and a belt guide 17. Here, the back frame 10 corresponds to the "seat frame" of the invention. The outer-side frame 11 constitutes a framework of a vehicle outer portion of the seatback 2. The inner-side frame 12 constitutes a framework of a vehicle inner portion of the seatback 2. The center-side frame 13 constitutes a framework of a boundary portion between the left seat region and the center seat region of the seatback 2.

The upper pipe 14 constitutes a framework of an upper portion of the seatback 2. The reinforcing pipes 15A, 15B constitute a framework of an intermediate portion in a height direction of the seatback 2. The two support brackets 16 are respectively provided in right and left sides of each of the left seat region and the center seat region in the upper pipe 14, and are configured as supporting frameworks that support the headrest 5 from below. The belt guide 17 is provided to contact the upper pipe 14 and the center-side frame 13, that is, the belt guide 17 is provided to connect the upper pipe 14 and the center-side frame 13. The belt guide 17 is configured as a guide framework for guiding a belt webbing that is extended from a retractor of a seatbelt device (not shown) from a rear side to a front side (i.e., a guide framework through which the belt webbing passes from the rear side to the front side).

The outer-side frame 11 is formed by pressing one piece of a steel plate material into a vertically elongated shape, and is disposed such that a surface thereof faces a seat width direction. The outer-side frame 11 is configured such that structural strength thereof with respect to bending and twisting is increased by bending each of edges in front and rear sides to an inner side in the seat width direction. In addition, as shown in FIG. 7, the outer-side frame 11 is formed in a bottom-widened shape in which plate width in the front-rear direction thereof is gradually widened toward below.

Figure 7:
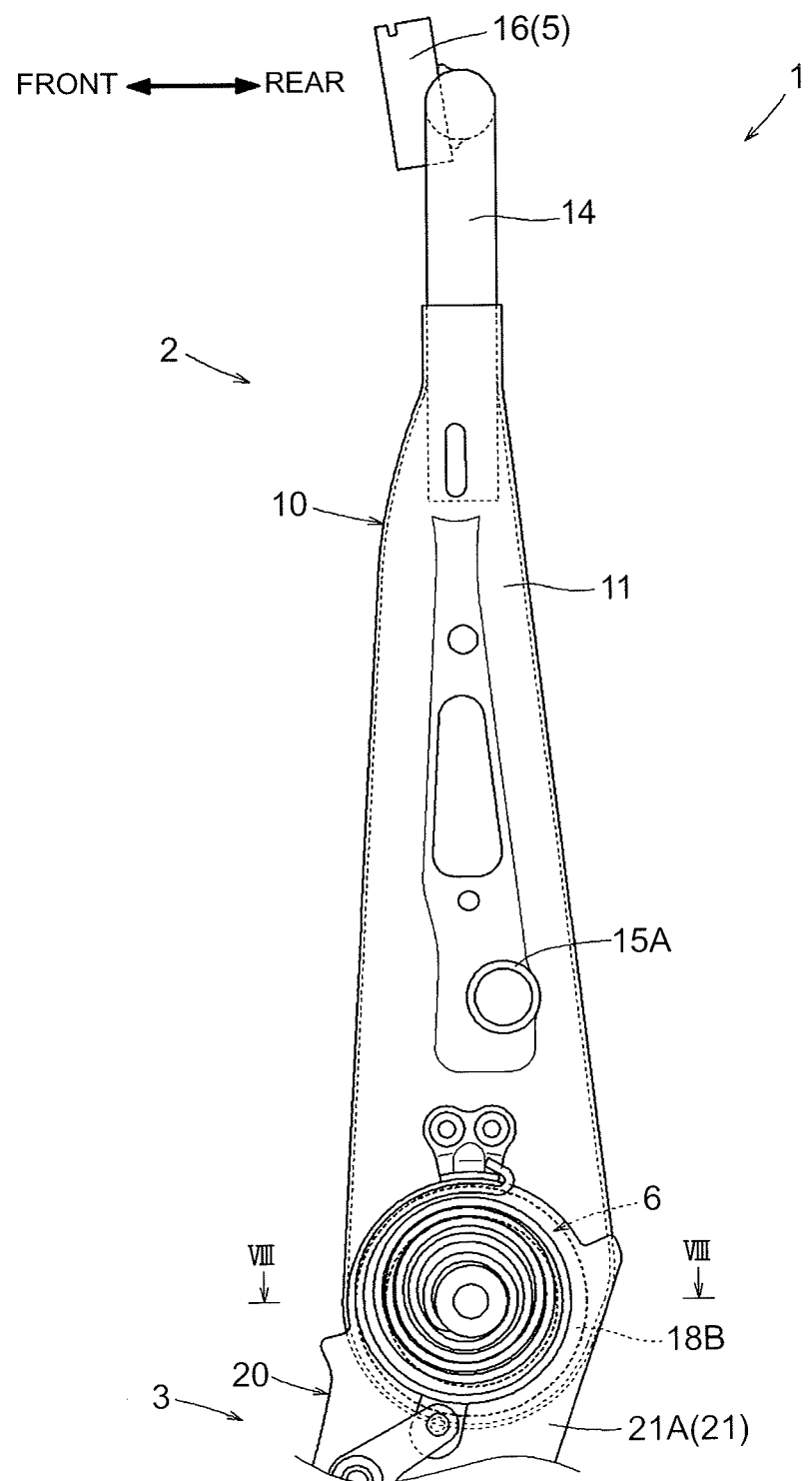
FIG. 7 is a side view that is seen from VII in FIG. 4.
Figure 8:
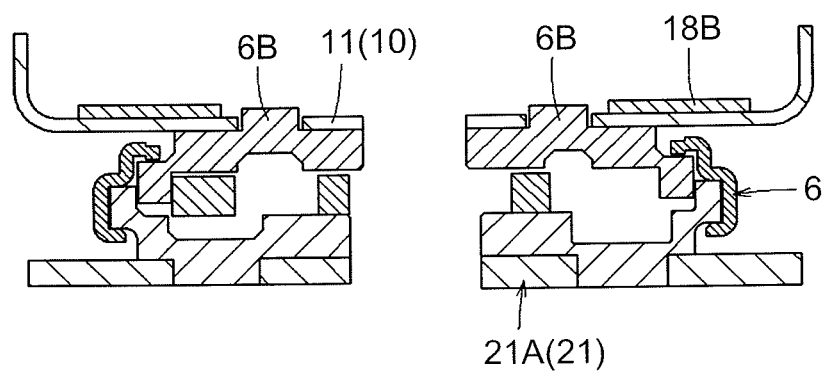
FIG. 8 is a cross-sectional view that is taken along line VIII-VIII in FIG. 7.
Figure 9:
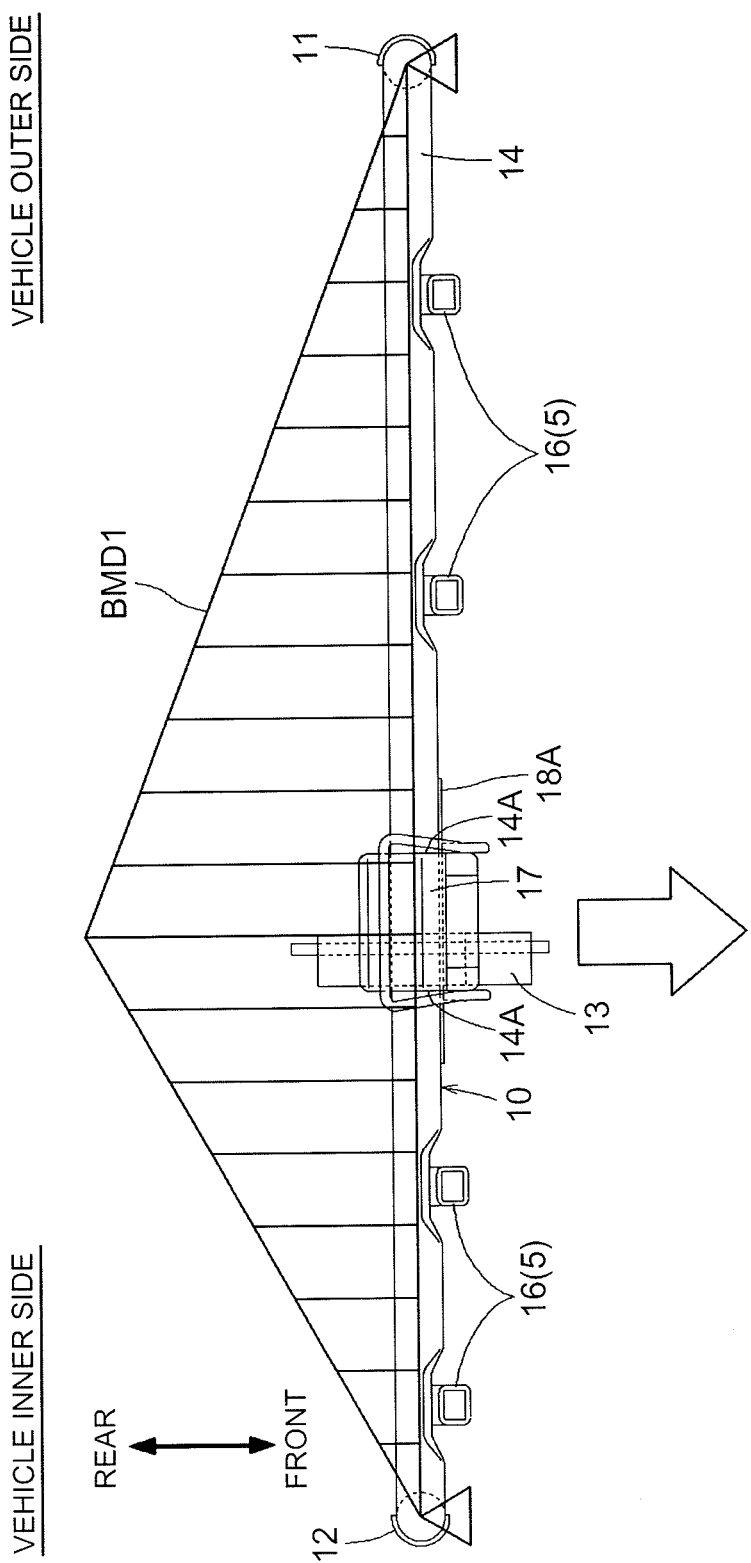
FIG. 9 is a schematic view in which distribution of bending moment applied to an upper pipe in FIG. 2 is modeled using a both-ends supported beam.
Figure 10:
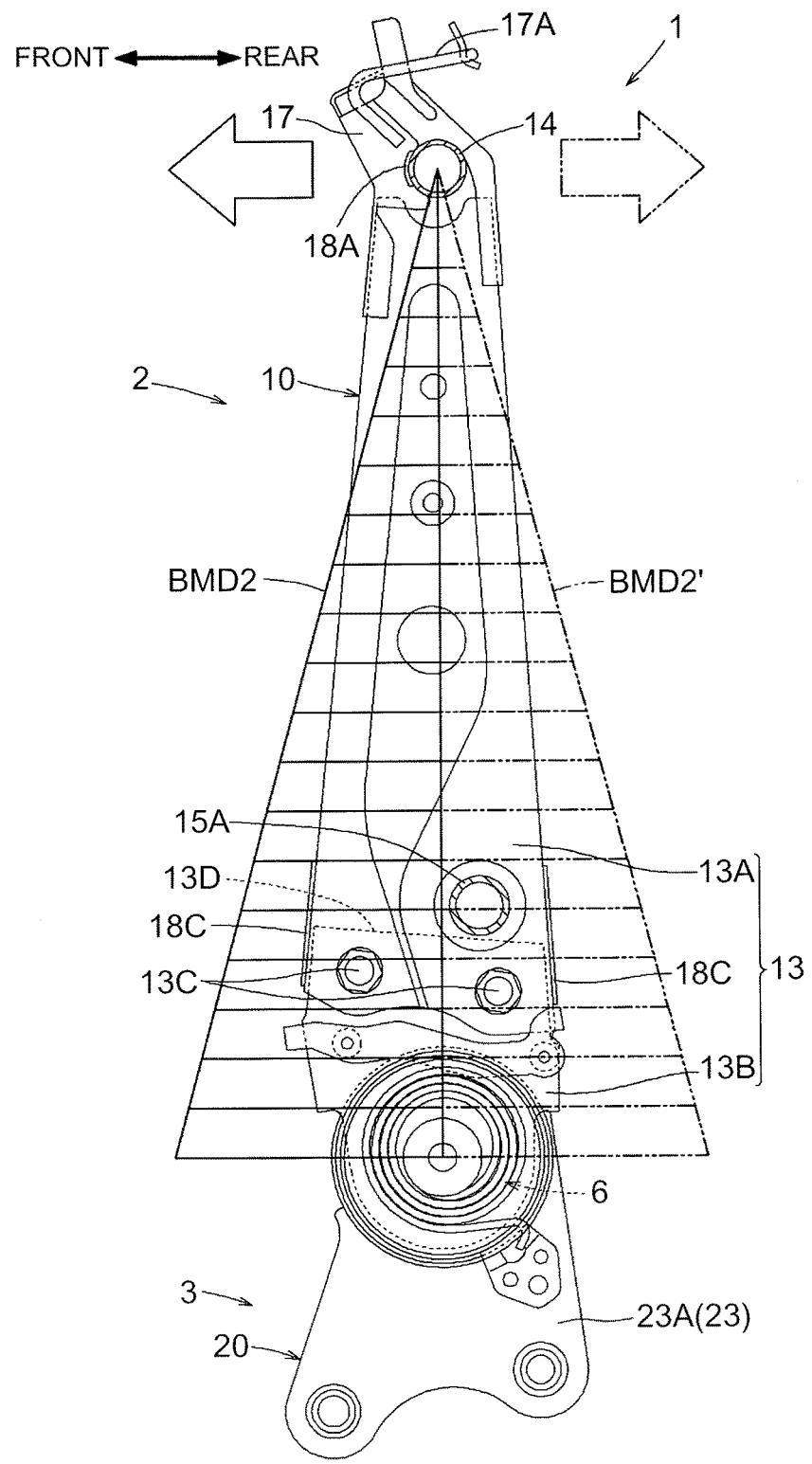
FIG. 10 is a schematic view in which distribution of bending moment applied to a center side frame in FIG. 2 to FIG. 3 is modeled using a cantilever.
Figure 11:
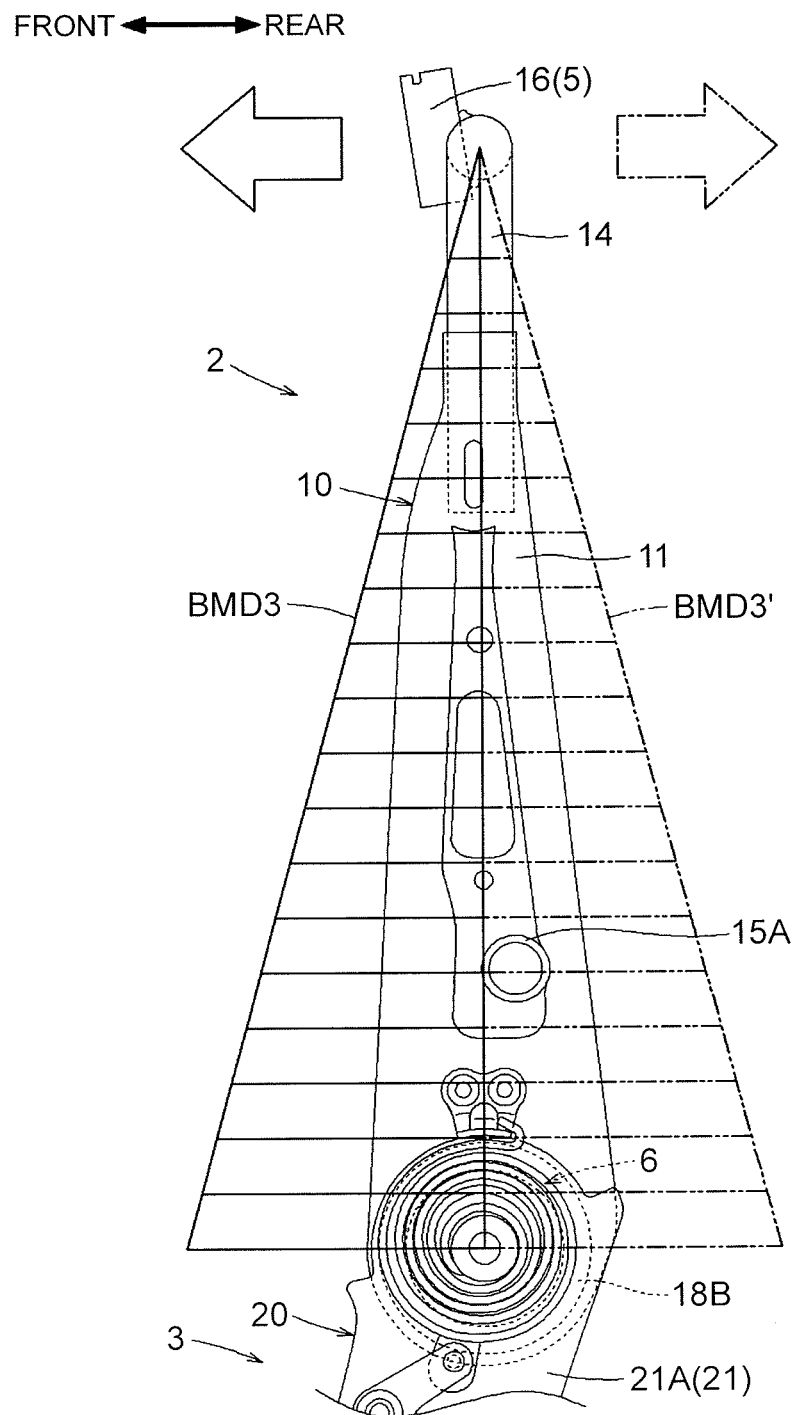
FIG. 11 is a schematic view in which distribution of bending moment applied to an outer side frame in FIG. 2 to FIG. 3 is modeled using a cantilever.

As shown in FIG. 7 to FIG. 8, the outer-side frame 11 is in a state where the recliner 6 is joined to an outer surface of a lower end side of the outer-side frame 11 and the outer-side frame 11 is coupled to a rear end of an outer-side frame 21 of the seat cushion 3, which will be described below, via the recliner 6. The recliner 6 is configured to function as a rotary shaft device, rotation of which can be stopped. When the recliner 6 is in a rotation stop state, the recliner 6 holds the outer-side frame 11 that is raised from the rear end of the seat cushion 3 in a state where the outer-side frame 11 is supported in a cantilever manner.

As shown in FIG. 1, the inner-side frame 12 is formed by pressing one piece of the steel plate material into a vertically elongated shape that is shorter than the outer-side frame 11, and is disposed such that a surface of the inner-side frame 12 faces the seat width direction. The inner-side frame 12 is also configured such that structural strength thereof with respect to bending and twisting is increased by bending each of edges in front and rear sides to the inner side in the seat width direction. The inner-side frame 12 is in a state where a lower end thereof is rotatably coupled to a rear end of an inner-side frame 22 of the seat cushion 3, which will be described below, by a hinge pin 6A.

The center-side frame 13 is configured such that an upper frame portion 13A and a lower frame portion 13B are integrally joined to each other by fastening two bolts 13C, that is, the front and rear bolts 13C, the upper frame portion 13A being formed by pressing one piece of the steel plate material into a vertically-elongated rectangular tube shape, and the lower frame portion 13B being formed by pressing one piece of the steel plate material that is thicker than the upper frame portion 13A into a vertically elongated shape. The center-side frame 13 is disposed such that a surface thereof faces the seat width direction. The center-side frame 13 is in a state where the recliner 6 is joined to a side surface of the vehicle inner side of the lower frame portion 13B made of the thick steel plate material and the center-side frame 13 is coupled to a rear end of a center-side frame 23 of the seat cushion 3, which will be described below, via the recliner 6. When the recliner 6 is in the rotation stop state, the recliner 6 holds the center-side frame 13 that is raised from the rear end of the seat cushion 3 in a state where the center-side frame 13 is supported in a cantilever manner.

Figure 5:
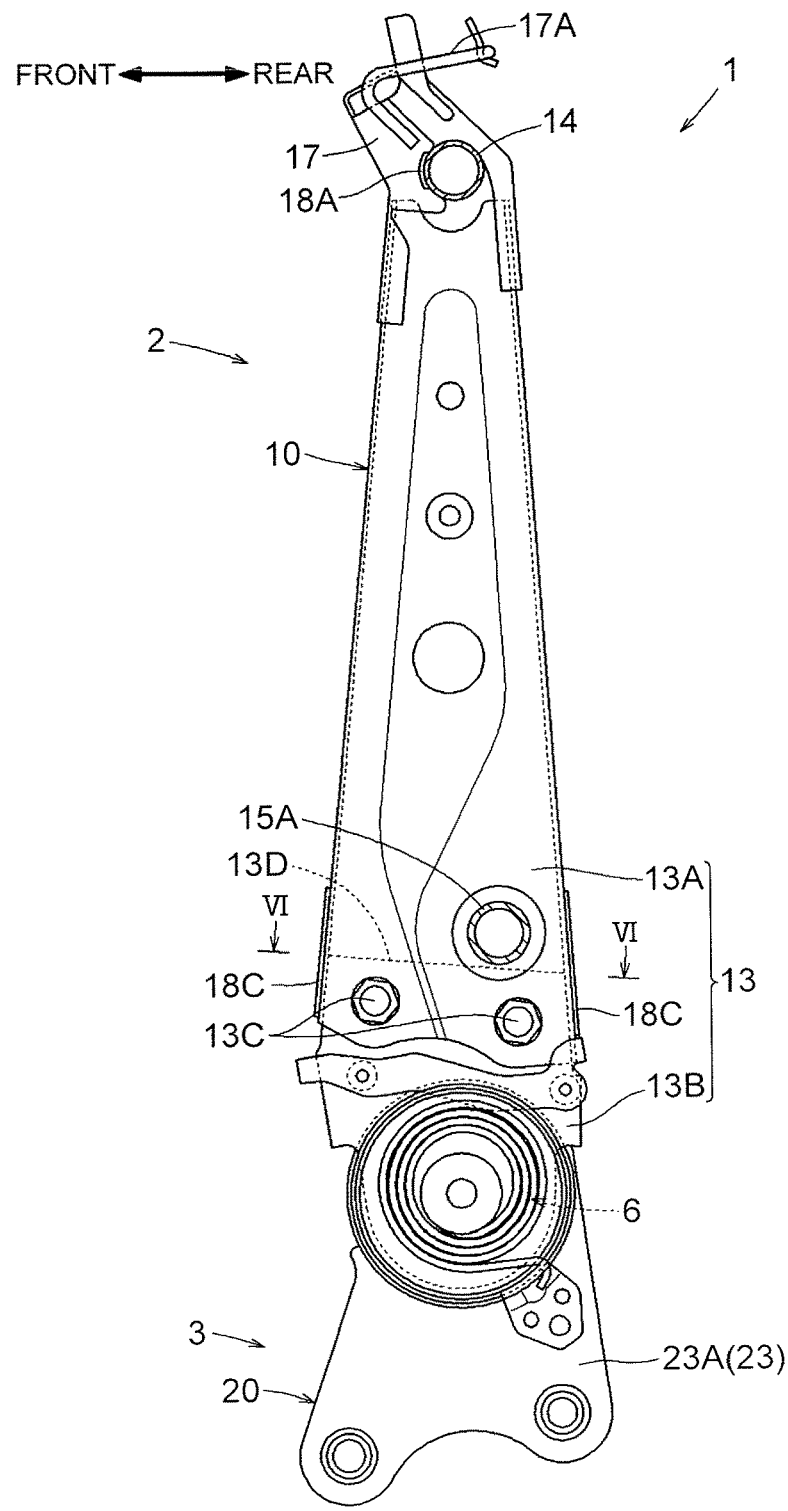
FIG. 5 is a cross-sectional view that is taken along line V-V in FIG. 4.
Figure 6:
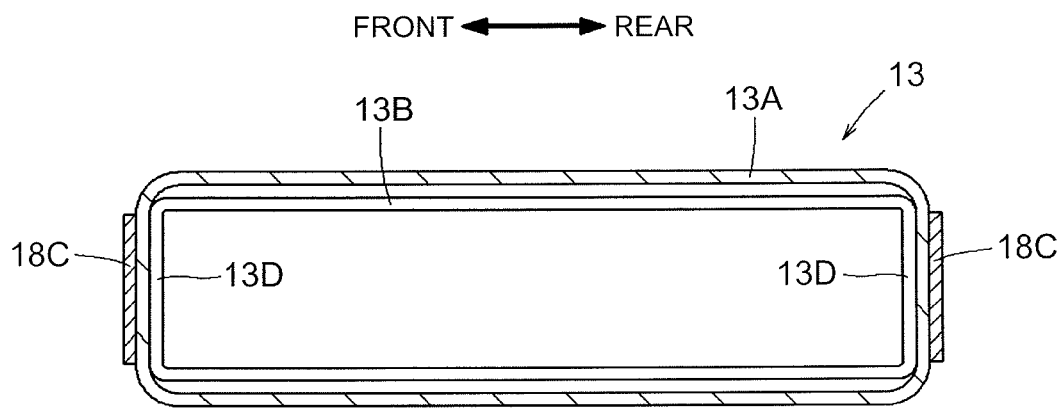
FIG. 6 is a cross-sectional view that is taken along line VI-VI in FIG. 5.

In detail, as shown in FIG. 5 to FIG. 6, the upper frame portion 13A is formed in the rectangular tube shape in which a cross section thereof is a rectangular cross section that is long in the front-rear direction. In addition, the upper frame portion 13A is formed in a bottom-widened shape in which tube width in the front-rear direction thereof is gradually widened toward below. The lower frame portion 13B is inserted in the rectangular tube of the upper frame portion 13A from below, and two bolts 13C, that is, the front and rear bolts 13C are inserted from the side, penetrate in the seat width direction, and are fastened in an overlapping portion in which the lower frame portion 13B is inserted. In this way, the upper frame portion 13A is integrally joined to an upper part of the lower frame portion 13B.

As shown in FIG. 5, the lower frame portion 13B is inserted in the rectangular tube of the upper frame portion 13A from below. In this way, the lower frame portion 13B is fitted in a state where each of surfaces in front and rear sides of an inserted part is in surface contact with a corresponding one of surfaces in front and rear sides of the rectangular tube of the upper frame portion 13A. With the configuration, the center-side frame 13 is configured such that the upper frame portion 13A and lower frame portion 13B are tightly and integrally joined to each other.

As shown in FIG. 1, the upper pipe 14 is formed by pressing one circular steel pipe into a substantially reverse U shape. The upper pipe 14 is fitted so as to extend across upper ends of the outer-side frame 11, inner-side frame 12, and center-side frame 13 (in other words, the upper pipe 14 is fitted so as to connect the upper ends of the outer-side frame 11, inner-side frame 12, and center-side frame 13). More specifically, a distal end of a leg of the upper pipe 14 on a vehicle outer side that is bent downward is fitted in a fitting portion of the outer-side frame 11 from the inner side in the seat width direction. The fitting portion is narrowed in a half-pipe shape and is in an upper end side of the outer-side frame 11. Then, the upper pipe 14 and the outer-side frame 11 are brought into a tightly and integrally joined state by welding.

In addition, a distal end of the leg of the upper pipe 14 on the vehicle inner side that is bent downward is fitted in a fitting portion of the inner-side frame 12 from the inner side in the seat width direction. The fitting portion is narrowed in a half pipe shape and is in an upper end side of the inner-side frame 12. Then, the upper pipe 14 and the inner-side frame 12 are brought into a tightly and integrally joined state by welding. Furthermore, in the upper pipe 14, an intermediate portion of an arm portion that extends in the seat width direction is set at a position immediately above an upper end surface of the center-side frame 13 and is tightly and integrally connected to the upper end of the center-side frame 13 by welding via the belt guide 17, which will be described below (see FIG. 5).

Figure 4:
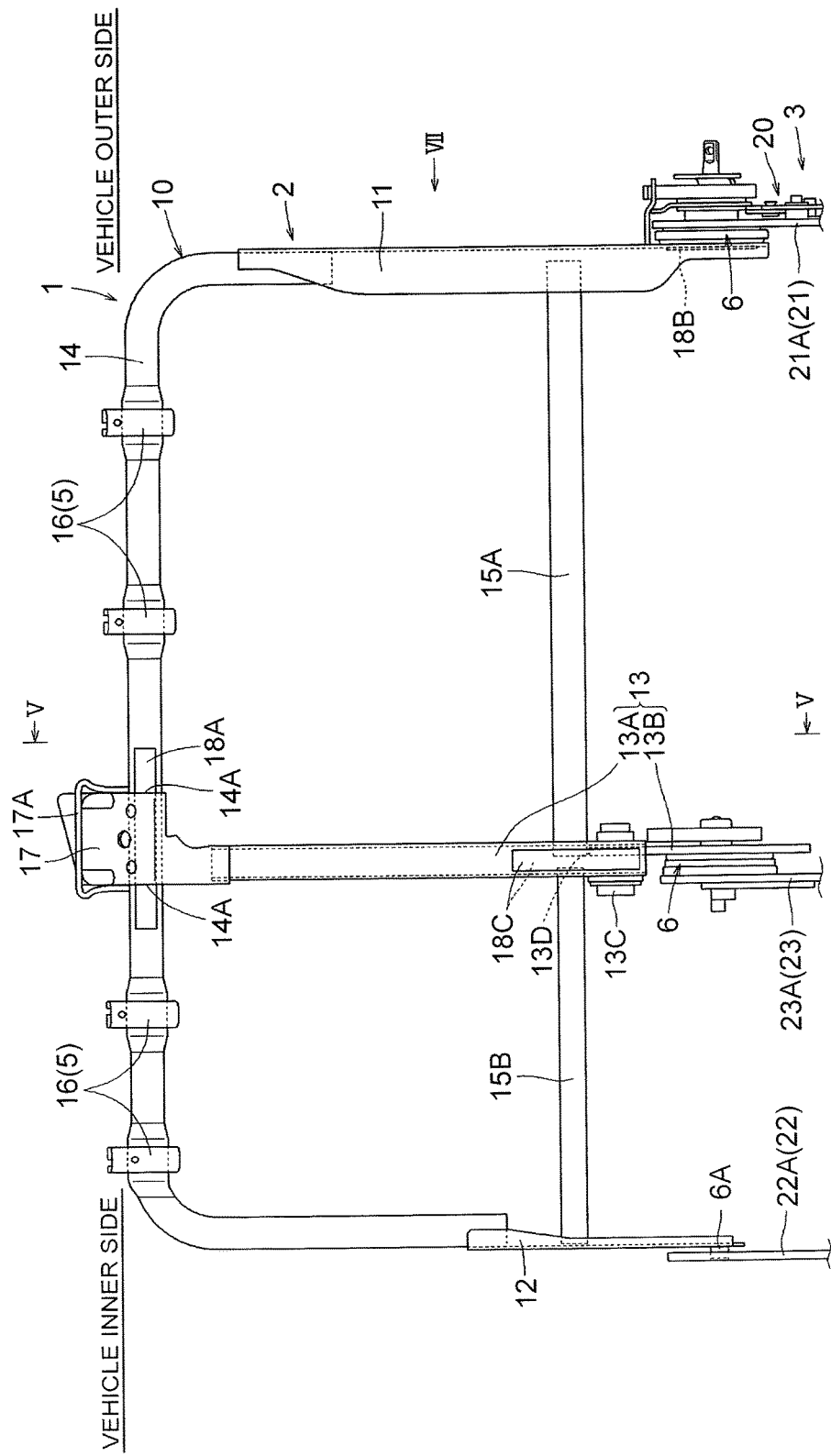
FIG. 4 is a front view of the back frame.

As shown in FIG. 1 and FIG. 4, each of the reinforcing pipes 15A, 15B is formed by pressing one circular steel pipe into a shape that is straight in the seat width direction. Then, the reinforcing pipe 15A is fitted to the outer-side frame 11 and a pipe wall in the vehicle outer side of the upper frame portion 13A of the center-side frame 13 such that the reinforcing pipe 15A penetrates the outer-side frame 11 and the pipe wall in the seat width direction. The reinforcing pipe 15A is tightly and integrally joined to the outer-side frame 11 and the pipe wall of the upper frame portion 13A by welding. The other reinforcing pipe 15B is fitted to the inner-side frame 12 and a pipe wall in the vehicle inner side of the upper frame portion 13A of the center-side frame 13 such that the reinforcing pipe 15B penetrates the inner-side frame 12 and the pipe wall in the seat width direction. The reinforcing pipe 15B is tightly and integrally joined to the inner-side frame 12 and the pipe wall of the upper frame portion 13A by welding.

Each of the support brackets 16 is formed by pressing the steel plate material into a quadrangular tube shape. The two support brackets 16 are respectively fitted to the right and left sides of each of the left seat region and the center seat region of the upper pipe 14. The support brackets 16 are fitted to the upper pipe 14 from a front side to extend in a substantially vertical direction, and are tightly and integrally joined to the upper pipe 14 by welding.

As shown in FIG. 1, FIG. 4, and FIG. 5, the belt guide 17 is formed by pressing the steel plate material into a base shape (pedestal shape). The belt guide 17 is fitted to a portion of the upper pipe 14 that is positioned immediately above the center-side frame 13 so as to connect the upper pipe 14 and the center-side frame 13 and to cover the upper pipe 14 and the center-side frame 13 from above. The belt guide 17 is tightly and integrally joined to the upper pipe 14 and the center-side frame 13 by welding. More specifically, the belt guide 17 is configured such that the steel plate material is bent in a substantially reverse U shape when seen from a side, both of right and left edges of a front piece and both of right and left edges of a rear piece of the belt guide 17 are bent in the front-rear direction so as to form side walls and a fitting portion that is recessed in a semicircular shape is formed at a bottom portion of each of the side walls.

The belt guide 17 is fitted to the portion of the upper pipe 14 that is positioned immediately above the center-side frame 13, from above. In this way, the fitting portion that is recessed in the semicircular shape is set so as to be fitted to the upper pipe 14 from above, and the front and rear pieces of the belt guide 17 bent in the reverse U shape are respectively set in surface contact with a front surface portion and a rear surface portion in the upper end side of the center-side frame 13. Then, the belt guide 17 is welded to the part of the upper pipe 14 at which the belt guide 17 contacts the upper pipe 14 and is welded to the part of the center-side frame 13 at which the belt guide 17 contacts the center-side frame 13. Thus, the belt guide 17 is tightly and integrally joined to the upper pipe 14 and the center-side frame 13.

A guide wire 17A that is bent in a substantially reverse U shape is fitted to an upper surface of the belt guide 17. The belt guide 17 is configured to guide the belt webbing that is extended upward from the retractor of the seat belt device that is not shown and is attached to a back surface of the back frame 10 so as to feed the belt webbing from a back surface side to the front side through the guide wire 17A. In addition, the belt guide 17 is configured to keep a position of the belt webbing such that the belt webbing can be put on a body of the seated occupant.

Meanwhile, as shown in FIG. 1, in the seat cushion 3, a cushion frame 20 that constitutes a framework thereof includes the outer-side frame 21, the inner-side frame 22, the center-side frame 23, a front pipe 24, and reinforcing pipes 25A, 25B. The outer-side frame 21 constitutes a framework of a vehicle outer portion of the seat cushion 3. The inner-side frame 22 constitutes a framework of a vehicle inner portion of the seat cushion 3. The center-side frame 23 constitutes a framework of a boundary portion between a left seat region and a center seat region of the seat cushion 3. The front pipe 24 constitutes a framework of a front side portion of the seat cushion 3. The reinforcing pipes 25A, 25B constitute a framework of a rear side portion of the seat cushion 3.

The outer-side frame 21 is formed by pressing one piece of the steel plate material into a shape that is elongated in the front-rear direction, and is disposed and raised such that a surface thereof faces the seat width direction. The outer-side frame 21 is configured such that structural strength thereof with respect to bending and twisting is increased by bending each of edges in upper and lower sides thereof to an inner side in the seat width direction. A reclining plate 21A that is thicker than the outer-side frame 21 is integrally joined to a rear end of the outer-side frame 21.

The recliner 6 is joined to an inner surface of a distal end of the reclining plate 21A that is joined to the rear end of the outer-side frame 21, the distal end extending rearward and upward. Thus, the outer-side frame 21 is coupled to the lower end of the outer-side frame 11 of the seatback 2 via the recliner 6. The outer-side frame 21 is provided so as to be integrally fitted to an upper portion of the slide rail 4.

The inner-side frame 22 is also formed by pressing one piece of the steel plate material into a shape that is elongated in the front-rear direction, and is also disposed and raised such that a surface thereof faces the seat width direction. The inner-side frame 22 is also configured such that structural strength thereof with respect to bending and twisting is increased by bending each of edges in upper and lower sides thereof to an inner side in the seat width direction. A hinge plate 22A that is thicker than the inner-side frame 22 is integrally joined to the rear end of the inner-side frame 22.

The lower end of the inner-side frame 12 of the seatback 2 is rotatably coupled by the hinge pin 6A to an inner surface of a distal end of the hinge plate 22A that is joined to the rear end of the inner-side frame 22, the distal end extending upward.

The center-side frame 23 is configured to have a closed cross section with high structural strength by pressing one piece of the steel plate material into a substantially rectangular tube shape that is elongated in the front-rear direction. A reclining plate 23A that is thicker than the center-side frame 23 is integrally joined to the rear end of the center-side frame 23. The recliner 6 is joined to a side surface on the vehicle inner side at a distal end of the reclining plate 23A that is joined to the rear end of the center-side frame 23, the distal end extending rearward and upward. Thus, the center-side frame 23 is coupled to a lower end of the center-side frame 13 of the seatback 2 via the recliner 6. The center-side frame 23 is provided so as to be integrally fitted to the upper portion of the slide rail 4.

The front pipe 24 is formed by pressing one circular steel pipe into a substantially U shape when seen in a plan view. The front pipe 24 is fitted so as to extend across front ends of the outer-side frame 21, inner-side frame 22, and center-side frame 23 (in other words, the front pipe 24 is fitted so as to connect the front ends of the outer-side frame 21, inner-side frame 22, and center-side frame 23). The front pipe 24 is tightly and integrally joined to the front ends of the outer-side frame 21, inner-side frame 22, and center-side frame 23 by welding.

Each of the reinforcing pipes 25A, 25B is formed by pressing one circular steel pipe into a shape that is elongated in the seat width direction. The reinforcing pipe 25A is fitted between the rear ends of the outer-side frame 21 and center-side frame 23 such that the reinforcing pipe 25A penetrates the rear ends of the outer-side frame 21 and center-side frame 23 in the seat width direction. The reinforcing pipe 25A is tightly and integrally joined to the rear ends of the outer-side frame 21 and center-side frame 23 by welding. The other reinforcing pipe 25B is fitted between the rear ends of the inner-side frame 22 and center-side frame 23 such that the reinforcing pipe 25B penetrates the rear ends of the inner-side frame 22 and center-side frame 23 in the seat width direction. The reinforcing pipe 25B is tightly and integrally joined to the rear ends of the inner-side frame 22 and center-side frame 23 by welding.

In the seat 1 that is configured as described above, each of the recliners 6 is normally in a state where rotation thereof is stopped, and a state where the backrest angle of the seatback 2 is fixed by the recliners 6 is maintained. In this way, a backrest load of the seated occupant that is applied to the seatback 2 and tension applied to the webbing of the seat belt device that is not shown and that is drawn from the belt guide 17 and is put on the body of the seated occupant are firmly received by rotation stop strength of each of the recliners 6 for supporting the back frame 10.

The back frame 10 that is supported by each of the recliners 6 from below is configured to have the high structural strength as described above. Meanwhile, when a large impact load is applied from the front or rear side upon occurrence of a front collision, a rear collision, or the like of the vehicle, the back frame 10 receives a large load of bending moment around each of support points for supporting the back frame 10. More specifically, for example, as shown in FIG. 2, when the front collision of the vehicle occurs in a state where the webbing of the seat belt device that is not shown and is drawn from the belt guide 17 is put on the body of the seated occupant, the body of the seated occupant may be strongly pressed against the belt webbing and a large tensile load toward the front side acts on the belt guide 17 that supports the belt webbing on the upper end side.

Due to input of this load, in the back frame 10, the upper pipe 14 for supporting the belt guide 17 receives a load of the bending moment toward the front side with both of the ends of the upper pipe 14 serving as supports. More specifically, the upper pipe 14 is configured to be supported in a both-ends supported beam manner in which both of the ends thereof are respectively supported by the outer-side frame 11 and the inner-side frame 12. Accordingly, as shown by a bending moment drawing BMD1 in FIG. 2 and FIG. 9, in the distribution of the bending moment that is applied to the upper pipe 14, the bending moment is gradually increased from support ends at both end sides of the upper pipe 14 toward a substantially central position that is a load input point.

Figure 2:
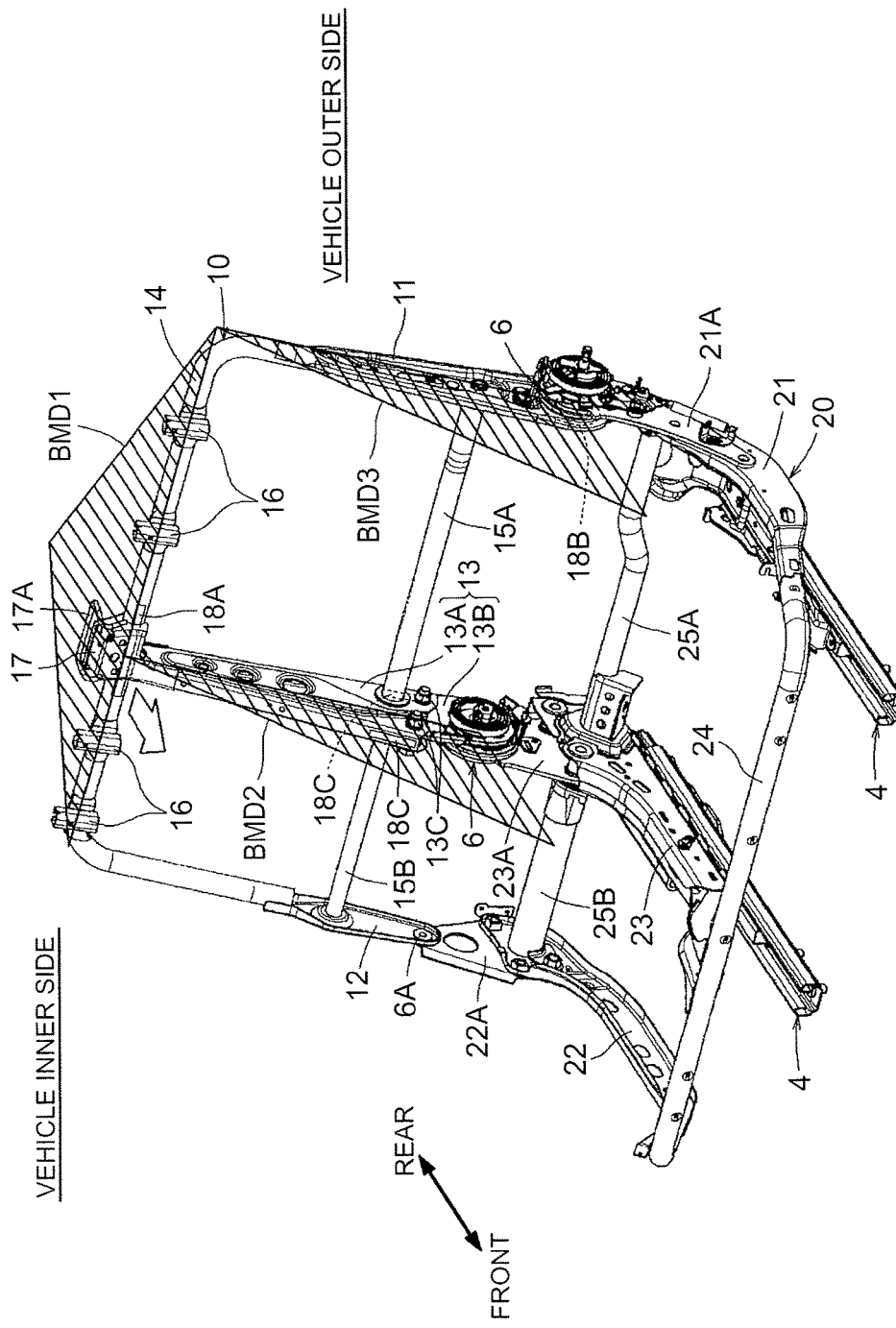
FIG. 2 is a perspective view that shows distribution of bending moment applied to a back frame at a time when a large forward load is applied to a belt guide.

In addition, in the back frame 10, due to the load input shown in FIG. 2, each of the center-side frame 13 and the outer-side frame 11, rotation of which is stopped by the recliner 6, also receives a load of bending moment toward the front side with the recliner 6 serving as a fixed end. More specifically, each of the center-side frame 13 and outer-side frame 11 is supported in a cantilever manner, that is, each of the center-side frame 13 and outer-side frame 11 is supported from below by the recliner 6 in a cantilever manner. Accordingly, as shown by bending moment drawings BMD2, BMD3 in FIG. 2 and FIG. 10 to FIG. 11, in the distribution of the bending moment applied to each of the center-side frame 13 and outer-side frame 11, the bending moment is gradually increased from the upper end side that is a free end side thereof toward the lower end side that is a fixed end side thereof.

Thus, when the large load of the bending moment as shown in FIG. 2 is applied to the back frame 10, local stress concentration may occur in each portion of the back frame 10 that receives the large load of the bending moment.

Figure 3:
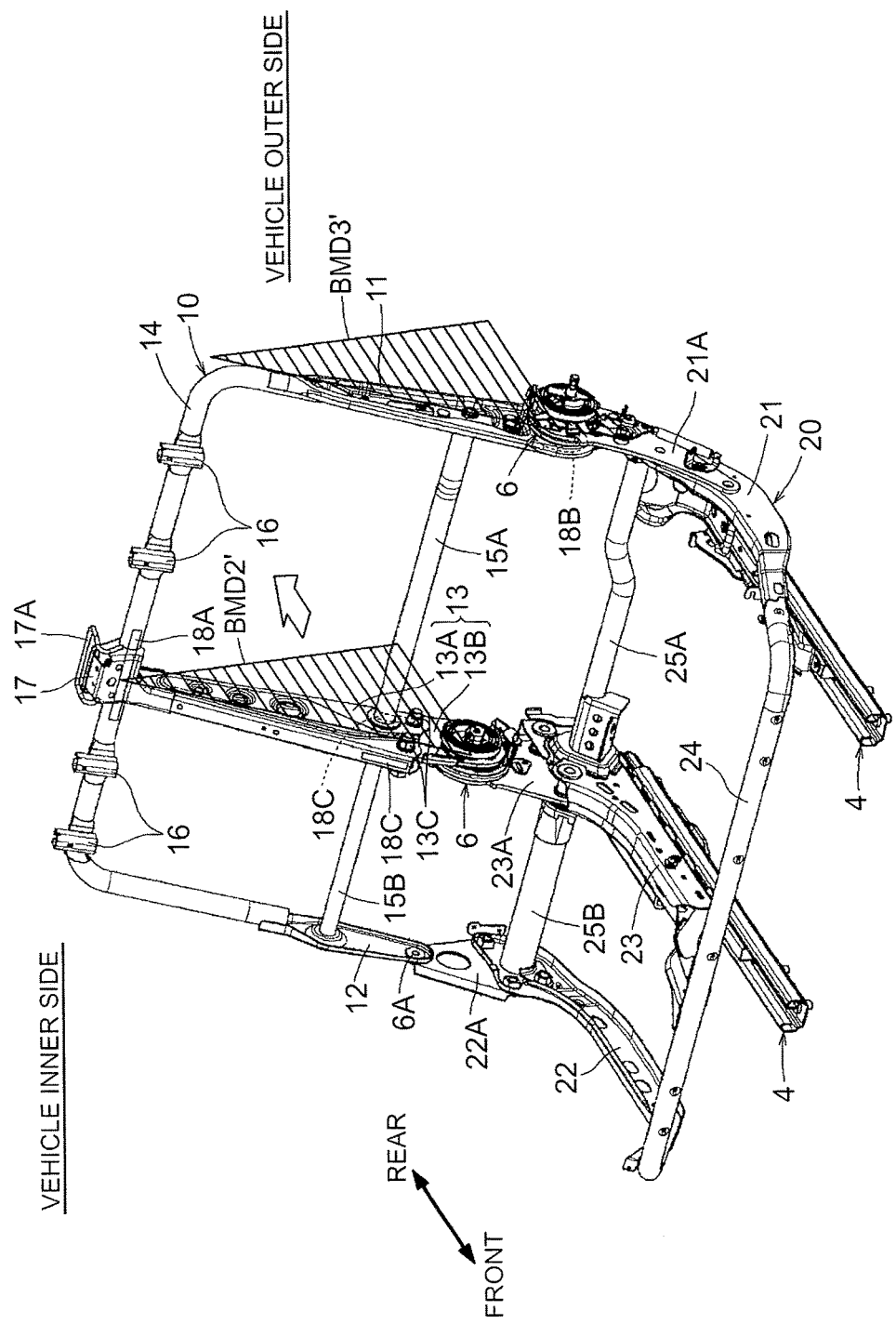
FIG. 3 is a perspective view that shows distribution of the bending moment applied to the back frame at a time when a large rearward load is applied to the seatback.

In addition, as shown in FIG. 3, when the rear collision of the vehicle occurs, the body of the seated occupant may be strongly pressed against the back frame 10 from the front side and load input may be applied to the center-side frame 13 and outer-side frame 11 to press the center-side frame 13 and outer-side frame 11 rearward. Due to this load input, in the back frame 10, each of the center-side frame 13 and the outer-side frame 11 receives a load of bending moment toward a rear side with the recliner 6 serving as a fixed end.

More specifically, each of the center-side frame 13 and outer-side frame 11 is supported in the cantilever manner, that is, each of the center-side frame 13 and outer-side frame 11 is supported from below by the recliner 6 in the cantilever manner as described above. Accordingly, as shown by bending moment drawings BMD2', BMD3' in FIG. 3 and FIG. 10 to FIG. 11, in the distribution of the bending moment applied to each of the center-side frame 13 and outer-side frame 11, the bending moment is gradually increased from the upper end side that is the free end side thereof toward the lower end side that is the fixed end side.

Thus, when the large load of the bending moment as shown in FIG. 3 is applied to the back frame 10, the local stress concentration may occur in each part of the back frame 10 that receives the large load of the bending moment. However, the seat 1 is provided with a reinforcing structure that can disperse the large load of the bending moment as described above so as to prevent occurrence of the stress concentration even when the large load is applied to each part of the back frame 10.

More specifically, the reinforcing structure includes a unidirectional tape (UD tape) 18A that is bonded to a front surface portion of the part of the upper pipe 14, the part being joined to the belt guide 17 as shown in FIG. 1 and FIG. 4 to FIG. 5; a UD tape 18B that is bonded to a periphery of the part of the outer-side frame 11, the part being joined to the recliner 6 as shown in FIG. 1 and FIG. 7 to FIG. 8; and UD tapes 18C that are respectively bonded to a front surface portion and a rear surface portion of the part of the upper frame portion 13A in the center-side frame 13, the part being joined to the lower frame portion 13B. Each of the UD tapes 18A, 18B, 18C has a known configuration in which carbon fiber is oriented in one direction, and is also configured such that specific gravity thereof is extremely smaller than that of each of steel materials constituting the back frame 10.

Among the UD tapes, as shown in FIG. 1 and FIG. 4 to FIG. 5, the UD tape 18A is bonded to the front surface portion of the part of the upper pipe 14, the part being joined to the belt guide 17 as described above. The UD tape 18A is bonded in a state where an orientation direction, in which the carbon fiber extends, is aligned with the seat width direction, in which the upper pipe 14 extends, such that the UD tape 18A extends across boundary portions 14A as joined parts of the upper pipe 14 to the belt guide 17 in the right-left direction. In detail, the UD tape 18A is bonded to the front surface portion that is a part of the upper pipe 14 in which a maximum tensile stress is generated at a time when the upper pipe 14 receives the load of the bending moment from the belt guide 17. The UD tape 18A is tightly and integrally bonded to the upper pipe 14 by thermal welding.

The UD tape 18A is bonded to the part. Accordingly, as described above by using FIG. 2 and FIG. 9, in the case where the large load of the bending moment is input to the upper pipe 14 from the belt guide 17 and the large tensile stress in the seat width direction is input to the front surface portion of the part of the upper pipe 14, the part being joined to the belt guide 17, the tensile stress is supported such that the stress is dispersed by the UD tape 18A. Thus, the stress concentration is less likely to occur in the portion.

In detail, in the boundary portions 14A, a cross-sectional shape of the upper pipe 14 is sharply changed due to joining to the belt guide 17 and the stress concentration is likely to occur. Thus, the UD tape 18A is provided to extend across the boundary portions 14A, which are the joined parts of the upper pipe 14 to the belt guide 17, in the right-left direction. Accordingly, the occurrence of the stress concentration in the region is effectively suppressed. In further detail, in the UD tape 18A, the orientation direction, in which the carbon fiber extends, is aligned with the seat width direction as an action direction of the tensile stress applied to the front surface portion of the upper pipe 14. The action direction of the tensile stress is a direction in which the tensile stress acts. In this way, the UD tape 18A can effectively and firmly receive the tensile stress applied to the front surface portion of the upper pipe 14. Accordingly, the large load of the bending moment that is input to the upper pipe 14 from the belt guide 17 is firmly received by the entire upper pipe 14 without causing the stress concentration in the joined part of the upper pipe 14 that is joined to the belt guide 17.

In addition, as shown in FIG. 1 and FIG. 7 to FIG. 8, the UD tape 18B is bonded to the periphery of the part of the outer-side frame 11 that is joined to the recliner 6 as described above, and the UD tape 18B is wound in an annular shape and bonded to the inner surface of the outer-side frame 11 so as to surround each of fitting parts from an outer peripheral side. In the fitting parts, a plurality of dowels 6B projected from the recliner 6 is fitted and welded to the outer-side frame 11. The UD tape 18B is bonded so as to surround joined parts in the outer-side frame 11, from the outer peripheral side. In each joined part, the cross-sectional shape of the outer-side frame 11 is sharply changed by joining to the recliner 6, and stress concentration is likely to occur in each joined part. The UD tape 18B is tightly and integrally bonded to the inner surface of the outer-side frame 11 by thermal welding in a state where the orientation direction, in which the carbon fiber extends, is aligned with a circumferential direction in which the UD tape 18B is wound in the annular shape.

The UD tape 18B is bonded to each joined part. Accordingly, as described above by using FIG. 2 to FIG. 3 and FIG. 10 to FIG. 11, in the case where the large load of the bending moment is input to the outer-side frame 11 and the large compression stress or the large tensile stress around the recliner 6 is input to the periphery of the part of the outer-side frame 11, the part being joined to the recliner 6, the stress is supported such that the stress is dispersed by the UD tape 18B. Thus, the stress concentration is less likely to occur in the part.

Moreover, as shown in FIG. 1 and FIG. 4 to FIG. 6, the UD tapes 18C are respectively bonded to the front surface portion and the rear surface portion of the part of the upper frame portion 13A in the center-side frame 13, the part being joined to the lower frame portion 13B as described above. The UD tapes 18C are respective bonded to the front surface portion and the rear surface portion of the upper frame portion 13A in a state where the orientation direction in which the carbon fiber extends is aligned with the height direction, so as to extend across an upper end of the lower frame portion 13B in the height direction, the upper end being inserted in the rectangular tube of the upper frame portion 13A from below.

In detail, in a boundary portion 13D of the center-side frame 13, the upper frame portion 13A is joined to the lower frame portion 13B. Thus, in the boundary portion 13D, a cross-sectional shape of the center-side frame 13 is sharply changed due to joining of the lower frame portion 13B to the upper frame portion 13A and the stress concentration is likely to occur. Thus, each of the UD tapes 18C is bonded to extend across the boundary portion 13D in the height direction. In further detail, the UD tapes 18C are respectively bonded to the front surface portion and the rear surface portion of the upper frame portion 13A in the center-side frame 13, the front surface portion and the rear surface portion being the parts in which the maximum tensile stress or maximum compression stress is generated at a time when the center-side frame 13 receives the load of the bending moment in the front-rear direction. The UD tapes 18C are tightly and integrally bonded to the front surface portion and the rear surface portion of the upper frame portion 13A by thermal welding, respectively.

As described above by using FIG. 2 to FIG. 3 and FIG. 10 to FIG. 11, the UD tapes 18C are respectively bonded to the front surface portion and the rear surface portion of the upper frame portion 13A. Therefore, in the case where the large load of the bending moment is input to the center-side frame 13 and the large tensile stress or the large compression stress in the height direction is input to the front surface portion and the rear surface portion of the part of the upper frame portion 13A, the part being joined to the lower frame portion 13B, the stress is supported such that the stress is dispersed by the UD tapes 18C. Thus, the stress concentration is less likely to occur in the portions.

In detail, in the boundary portion 13D of the center-side frame 13, the upper frame portion 13A is joined to the lower frame portion 13B. Thus, in the boundary portion 13D, the cross-sectional shape of the center-side frame 13 is sharply changed due to joining of the lower frame portion 13B to the upper frame portion 13A and the stress concentration is likely to occur. Thus, each of the UD tapes 18C is bonded to extend across the boundary portion 13D in the height direction. Accordingly, the occurrence of the stress concentration in the part (i.e., the part of the upper frame portion 13A that is joined to the lower frame portion 13B) is effectively suppressed. In further detail, in each of the UD tapes 18C, the orientation direction, in which the carbon fiber extends, is aligned with the height direction that is the action direction of the tensile stress or the compression stress applied to the front surface portion and the rear surface portion of the upper frame portion 13A. In this way, the UD tapes 18C can effectively and firmly receive the tensile stress or the compression stress that is applied to the front surface portion and the rear surface portion of the upper frame portion 13A. Accordingly, the large load of the bending moment that is input to the center-side frame 13 is firmly received by the entire center-side frame 13 without causing the stress concentration in the joined part of the upper frame portion 13A that is joined to the lower frame portion 13B.

The description is summarized as follows. The seat 1 of the embodiment has the following configuration. That is, the seat 1 includes the metal back frame 10 (i.e., the back frame 10 made of metal). In the seat 1, the UD tapes 18A, 18B, 18C (reinforcing members) are locally attached to the portions in which the stress concentration occurs in the back frame 10. Each of the UD tapes 18A, 18B, 18C is attached in a state in which the UD tape disperses the stress. Each of the UD tapes 18A, 18B, 18C has specific gravity smaller than that of the back frame 10. In the configuration, the stress concentration is less likely to occur in the back frame 10 due to each of the UD tapes 18A, 18B, 18C that are locally attached to the portions in which the stress concentration occurs in the back frame 10, while an increase in the weight of the back frame 10 is suppressed.

The embodiment of the invention has been described. However, the invention can be implemented in various modes other than the above-described embodiment. For example, the vehicle seat of the invention can be applied to a seat other than the rear seat of the automobile, and may be a seat that is applied to a vehicle other than the automobile, such as a train. In addition, the vehicle seat of the invention can be widely applied to seats that are used in various transportation means, such as an aircraft and a vessel.

In addition, in the embodiment, the UD tape is employed as a member that corresponds to the reinforcing member of the invention. However, the reinforcing member may be formed of a material other than the UD tape, such as a resin material or lightweight metal (aluminum or magnesium) as long as specific gravity of the reinforcing member is smaller than that of the seat frame, the reinforcing member is locally attached to the portion in which the stress concentration occurs in the seat frame, and the reinforcing member is attached in the state in which the reinforcing disperses the stress. In addition, the structure to which the reinforcing member is applied is not limited to the frame structure of the seatback. The reinforcing member may be applied to frame structures of other seat structural bodies, such as the seat cushion and the headrest. Furthermore, the reinforcing member does not necessarily need to be attached to the seat frame in the state in which the reinforcing member is integrated with the seat frame, as long as the reinforcing member is locally attached to the portion in which the stress concentration occurs in the seat frame, and the reinforcing member is attached in the state in which the reinforcing member disperses the stress.

Moreover, when the UD tape is used as the reinforcing member, the orientation direction of the UD tape, in which the carbon fiber extends, does not necessarily need to be aligned with the action direction of the tensile stress or the compression stress. For example, the UD tape may be provided such that the orientation direction, in which the carbon fiber extends, is aligned with a direction perpendicular to the action direction of the compression stress in the seat frame, so as to effectively prevent out-of-plane buckling that is associated with the compression stress in the seat frame. The UD tapes may be stacked in a plurality of layers such that the orientation directions, in which the carbon fiber extends, cross each other, or the structural strength is increased.

In addition, when the reinforcing member is applied to the frame structure of the seatback, the reinforcing member can be applied to parts other than indicated in the embodiment. More specifically, the parts include rear surface portions of the parts of the upper pipe 14 described above by using FIG. 1 and FIG. 4, to which the support brackets 16 are joined, and the like. In the case where the reinforcing member is applied to each of such parts, even when the large load of the bending moment is applied to the upper pipe due to the load that is transmitted from the headrest to each of the support brackets upon occurrence of the collision of the vehicle, the stress concentration that possibly occurs in the parts of the upper pipe joined to the support brackets due to this bending moment is appropriately dispersed by providing the reinforcing member.

In detail, the reinforcing members are provided in the rear surface portions of the upper pipe. That is, the reinforcing members are provided in the parts of the upper pipe, in each of which the maximum tensile stress or the maximum compression stress occurs at a time when the load of the bending moment is applied thereto. Thus, the stress concentration is less likely to occur due to the reinforcing members. Note that the reinforcing member does not necessarily need to be provided in a portion on which the maximum tensile stress or the maximum compression stress acts in the seat frame, as long as the reinforcing member is provided at a position where the reinforcing member makes the stress concentration less likely to occur.

In addition, the reinforcing member may be provided to constrain a change in circumferential length of the seat frame due to tension or compression thereof. Alternatively, the reinforcing member may be provided to suppress breakage due to tension or the out-of-plane buckling due to the compression. The reinforcing member may be attached to the seat frame in the state in which the reinforcing member disperses the stress, by adhesion using an adhesive, press-fitting, or rolling, in addition to thermal welding.

In addition, as shown in FIG. 6, in the embodiment, the UD tapes 18C as the reinforcing members in flat sheet shapes are respectively bonded to the front surface portion and the rear surface portion of the upper frame portion 13A of the center-side frame 13 of the seatback 2. However, in addition to the above-described manners in which the reinforcing members are attached to the seat frame, the reinforcing member may be attached to the seat frame in a manner described below, regardless of whether the reinforcing member is a flexible member such as the UD tape.

Figure 12:
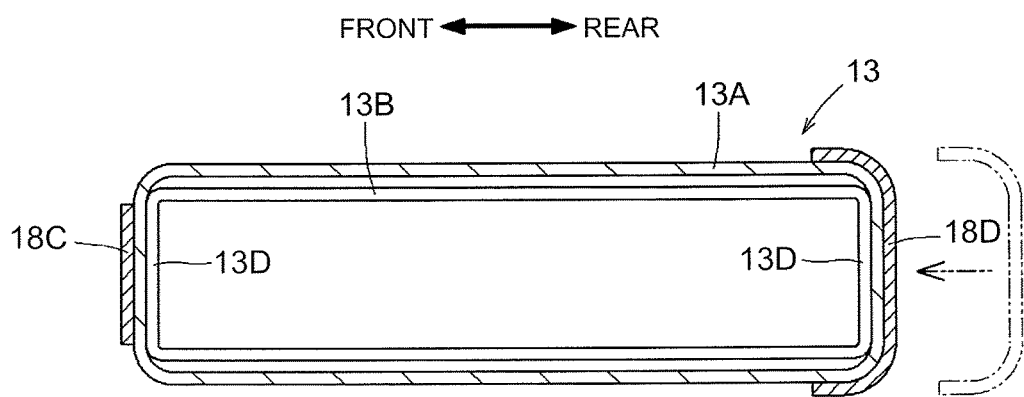
FIG. 12 is a schematic view that shows a structure of a main portion in another embodiment.

As shown in FIG. 12, for example, a reinforcing member 18D is attached to a rear surface portion of the center-side frame 13 (a portion in which the stress concentration occurs in the seat frame). The reinforcing member 18D may be formed in advance to have a U shape that conforms to the rear surface portion and side surface portions in right and left sides of the center-side frame 13, and the reinforcing member may be fitted and attached to the center-side frame 13 so as to conform to the rear surface portion and the side surface portions in the right and left sides thereof. Note that the reinforcing member 18D may be integrally bonded to the center-side frame 13 by any of various adhesion means, such as press-fitting, in addition to thermal welding and the adhesion using the adhesive.

Figure 13:
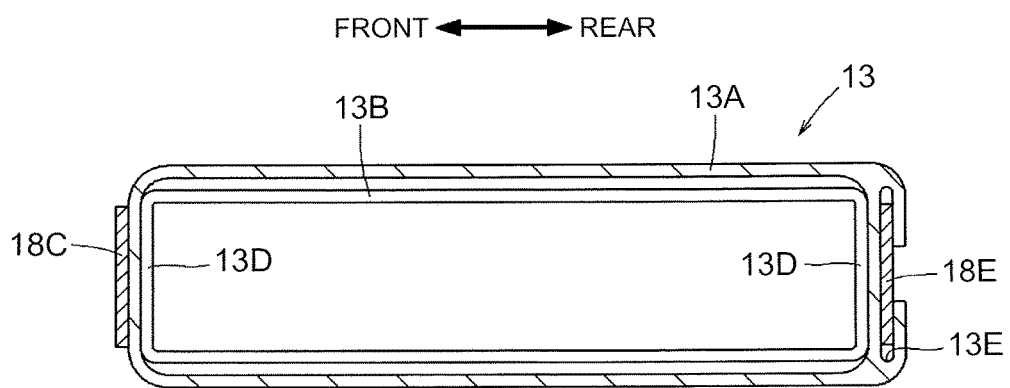
FIG. 13 is a schematic view that shows a structure of a main portion in yet another embodiment.

In addition, as shown in FIG. 13, an accommodation pocket 13E in which a reinforcing member 18E can be inserted may be formed in the rear surface portion of the center-side frame 13, and the reinforcing member 18E may be inserted in the accommodation pocket 13E from above or below to be attached to the center-side frame 13. At this time, the reinforcing member 18E may be press-fitted in the accommodation pocket 13E of the center-side frame 13 so as to be integrally joined to the accommodation pocket 13E. Alternatively, the reinforcing member 18E may be integrally joined to the accommodation pocket 13E by swaging the accommodation pocket 13E after insertion. In addition, the reinforcing member 18E may be integrally joined to the inside of the accommodation pocket 13E by the means such as thermal welding or the adhesion using the adhesive.

Figure 14:
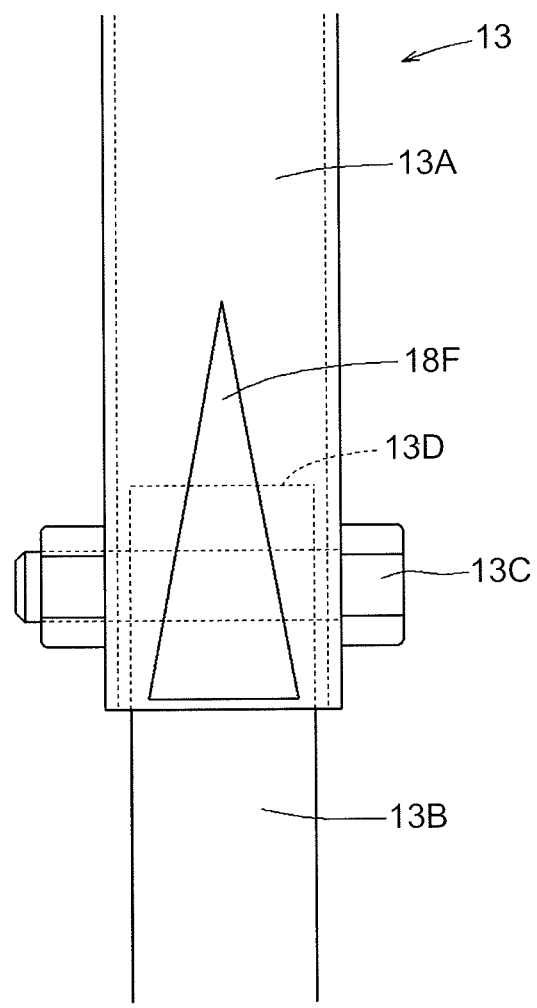
FIG. 14 is a schematic view that shows a structure of a main portion in yet another embodiment.

In addition, the reinforcing member may be provided in the portion in which the stress concentration occurs in the seat frame such that the reinforcing member extends along a specific in-plane direction, and at least one of a size and a shape of the reinforcing member may be changed in accordance with a magnitude of the stress. More specifically, for example, as shown in FIG. 14, a reinforcing member 18F is attached to the rear surface portion of the center-side frame 13 (i.e., the portion in which the stress concentration occurs in the seat frame). The reinforcing member 18F is provided so as to extend across the boundary portion 13D of the upper frame portion 13A in the height direction, the boundary portion 13D being joined to the lower frame portion 13B. The reinforcing member 18F may be attached such that a shape of the reinforcing member 18F is tapered as the reinforcing member 18F extends upward beyond the boundary portion 13D (i.e., the shape of the reinforcing member 18F is tapered in an upward direction). With the configuration, it is possible to suppress a sharp increase in the structural strength of the upper frame portion 13A at a part to which the reinforcing member 18F is attached. Thus, the stress concentration is less likely to occur in the seat frame.

What is claimed is:

1. A vehicle seat comprising:
a seat frame that includes a plurality of frame members joined to each other at a plurality of connection points in which a stress concentration occurs in the seat frame during a vehicle collision, the connection points being regions where joined frame members make surface contact with each other; and
a reinforcing member that is attached to at least one of the plurality of joined frame members such that the reinforcing member extends across and overlaps at least one connection point of at least one set of joined frame members of the plurality of joined frame members to disperse a stress from the stress concentration that occurs at the at least one connection point during the vehicle collision, and
the reinforcing member having a specific gravity smaller than a specific gravity of the seat frame.

2. The vehicle seat according to claim 1, wherein the reinforcing member is a unidirectional tape.

3. A vehicle seat comprising:
a seat frame including at least two frame members joined to each other at at least two connection points in which a stress concentration occurs in the seat frame during a vehicle collision, the connection points being regions where the at least two joined frame members make surface contact with each other; and
a reinforcing member that extends across and overlaps at least one of the at least two connection points of the at least two joined frame members to disperse a stress from the stress concentration that occurs at the at least two connection points during the vehicle collision, and the reinforcing member having a specific gravity smaller than a specific gravity of the seat frame, wherein
the reinforcing member is attached to at least one of a side surface of one of the at least two frame members on an outer peripheral side of the one of the at least two frame members in a direction extending across the at least one of the at least two connection points in which a maximum tensile stress is generated at a time when a load causing bending in a direction perpendicular to a longitudinal direction in which the seat frame extends is applied to the seat frame, and a side surface of the one of the at least two frame members on an inner peripheral side of the one of the at least two frame members in the direction extending across the at least one of the at least two connection points in which a maximum compression stress is generated at the time when the load is applied to the seat frame,
the reinforcing member being attached to the at least one of the outer peripheral side and the inner peripheral side of the one of the at least two frame members in a state in which the reinforcing member receives the load and disperses a corresponding one of the maximum tensile stress and the maximum compression stress.

4. The vehicle seat according to claim 3, wherein the reinforcing member is a unidirectional tape.

5. A vehicle seat comprising:
a seat frame including at least two frame members joined to each other at a connection point in which a stress concentration occurs in the seat frame during a vehicle collision, the connection point being a region where the at least two joined frame members make surface contact with each other; and
a reinforcing member that extends across and overlaps the connection point of the at least two joined frame members to disperse a stress from the stress concentration that occurs at the connection point during the vehicle collision, and the reinforcing member having a specific gravity smaller than a specific gravity of the seat frame, wherein
the reinforcing member is provided on one of the at least two frame members in a direction extending across the connection point in which the stress concentration occurs such that the reinforcing member extends along a specific in-plane direction, and at least one of a size and a shape of the reinforcing member is changed in accordance with a magnitude of the stress.

6. The vehicle seat according to claim 5, wherein the reinforcing member is a unidirectional tape.

* * * * *